(12) United States Patent
He et al.

(10) Patent No.: US 9,159,988 B2
(45) Date of Patent: Oct. 13, 2015

(54) METHODS FOR MAKING CURRENT COLLECTOR AND ELECTRODE OF ELECTROCHEMICAL BATTERY

(71) Applicants: Xiang-Ming He, Beijing (CN); Jian-Jun Li, Beijing (CN); Li Wang, Beijing (CN); Jian Gao, Beijing (CN)

(72) Inventors: Xiang-Ming He, Beijing (CN); Jian-Jun Li, Beijing (CN); Li Wang, Beijing (CN); Jian Gao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 182 days.

(21) Appl. No.: 13/719,993

(22) Filed: Dec. 19, 2012

(65) Prior Publication Data
US 2014/0113065 A1  Apr. 24, 2014

(30) Foreign Application Priority Data

Oct. 24, 2012  (CN) .......................... 2012 1 04090652

(51) Int. Cl.
C23C 26/00 (2006.01)
H01M 4/04 (2006.01)
H01M 4/66 (2006.01)
H01M 4/133 (2010.01)

(52) U.S. Cl.
CPC .......... H01M 4/0404 (2013.01); H01M 4/0409 (2013.01); H01M 4/663 (2013.01); H01M 4/667 (2013.01); H01M 4/133 (2013.01); Y02E 60/122 (2013.01)

(58) Field of Classification Search
CPC ...... H01B 13/32; H01B 13/322; H01B 13/34; C01B 31/0469; C01B 31/0438; C01B 31/0423; C01B 31/04; C01B 2204/04; H01M 4/0404; H01M 4/04
USPC ............................................. 427/11, 58, 122
See application file for complete search history.

(56) References Cited

U.S. PATENT DOCUMENTS

2011/0195207 A1* 8/2011 Hong et al. .................. 428/34.1
2012/0241690 A1* 9/2012 Janowska et al. ............. 252/511
2013/0065034 A1* 3/2013 Muramatsu .................... 428/213
2013/0244009 A1* 9/2013 Jesudoss et al. ........... 428/195.1

FOREIGN PATENT DOCUMENTS

CN  102208598 A     10/2011
CN  102208598 A  *  10/2011
TW  201242468        10/2012

* cited by examiner

Primary Examiner — Kelly M Gambetta
(74) Attorney, Agent, or Firm — Novak Druce Connolly Bove + Quigg LLP

(57) ABSTRACT

A method for making a current collector of an electrochemical battery is disclosed. In the method, a current collecting metal substrate and a solid graphite source are provided. A graphite/graphene layer is formed on at least one surface of the current collecting metal substrate, by rubbing the at least one surface of the current collecting metal substrate with the solid graphite source. A method for making an electrode of an electrochemical battery is also disclosed.

17 Claims, 12 Drawing Sheets

Providing a current collecting metal substrate and a solid graphite source

↓

Forming a graphite/graphene layer on at least one surface of the current collecting metal substrate, by rubbing the at least one surface of the current collecting metal substrate with a solid graphite source

METHODS FOR MAKING CURRENT COLLECTOR AND ELECTRODE OF ELECTROCHEMICAL BATTERY

CROSS-REFERENCE TO RELATED APPLICATIONS

This application claims all benefits accruing under 35 U.S.C. §119 from China Patent Application No. 201210409065.2, filed on Oct. 24, 2012 in the China Intellectual Property Office, the content of which is hereby incorporated by reference.

BACKGROUND

1. Technical Field

The present disclosure relates to methods for making current collectors and methods for making electrodes of electrochemical batteries having the current collectors.

2. Description of Related Art

Current collector is an important part in an electrochemical battery. The current collector is used for supporting electrode active material and providing an electron transfer route between the electrode active material and an outside circuit. Therefore, a performance of the current collector affects a performance of the electrochemical battery.

Conventional current collectors usually are metal sheets, plates, or foils, such as copper foils and aluminum foils. However, the metal sheets are easily to be oxidized to form a passive film or corroded by an electrolyte solvent of the electrochemical battery to form an insulating layer on the surface thereof. The passive film or insulating layer greatly increases a contact resistance between the electrode active material and the metal foil, thereby decreasing a discharge capacity and capacity retention of the electrochemical battery. A layer of graphene is formed on the surface of the current collector to improve the performance of the current collector by dispersing graphene powder, in a solvent, to form a graphene solution first and then coating and drying the graphene solution on the surface of the metal foil. However, this method needs a high uniformity of the dispersing and a high uniformity of the coating related to complicated processes, which are difficult to be compatible with the present electrochemical battery manufacture industry.

What is needed, therefore, is to provide a method for making a current collector and a method for making an electrode of an electrochemical battery having the current collector, which are efficiency to improve the discharge capacity and capacity retention, and simple and compatible with the present electrochemical battery manufacture industry.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
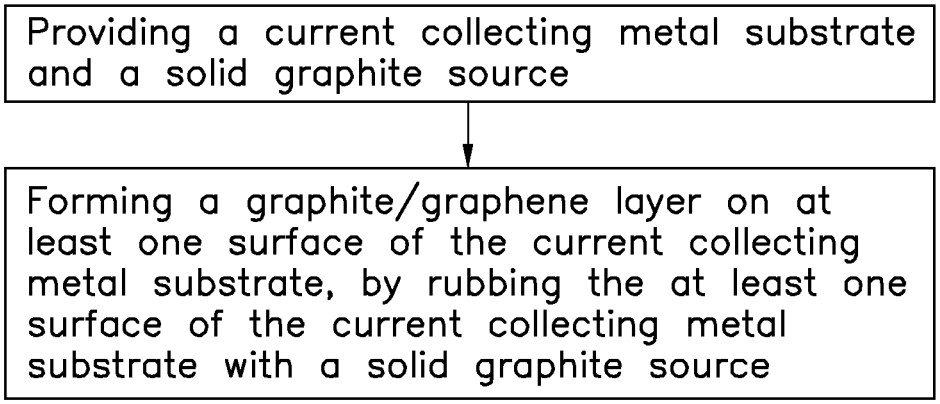
FIG. 1 is a flowchart of one embodiment of a method for making the current collector of the electrochemical battery.

Referring to FIG. 1, one embodiment of a method for making a current collector of an electrochemical battery includes steps of:

S1, providing a current collecting metal substrate and a solid graphite source; and S2, forming a graphite/graphene layer on at least one surface of the current collecting metal substrate by rubbing the at least one surface of the current collecting metal substrate with the solid graphite source.

The current collecting metal substrate is used to support the graphite/graphene layer and the electrode material layer, of the electrochemical battery, to collect and conduct the currents generated in the electrode active material to the outside circuit, and conduct the current from the outside circuit to the electrode active material. The electrochemical battery can be a lithium ion battery. The current collecting metal substrate can have a plate shape, sheet shape, film shape, or foil shape, with or without pores or holes. A thickness of the current collecting metal substrate can be in a range from about 0.5 microns to about 1 millimeter. In one embodiment, the thickness of the current collecting metal substrate is in a range from about 1 micron to about 200 micron. A material of the current collecting metal substrate can be metal or alloy. The material of the current collecting metal substrate for the cathode electrode can be aluminum, titanium, or stainless steel. The material of the current collecting metal substrate for the anode electrode can be copper, nickel, or stainless steel. The current collecting metal substrate can have two opposite surfaces, and the electrode material layer is formed on at least one surface of the current collecting metal substrate. To be continuously manufactured in the electrochemical battery manufacture industry, the current collecting metal substrate can have a relatively long length, which can be cut into a plurality of parts for forming a plurality of current collectors continuously.

The solid graphite source can be an integrated graphite monolith or an aggregated graphite powder. The graphite power is compacted together to have a fixed shape and a high density. The solid graphite source can have a bar shape, a plate shape, a ball shape, a box shape, or an irregular block shape. A material of the solid graphite source can be natural graphite or synthetic graphite. To easily exfoliate graphene from the solid graphite source, the material of the solid graphite source can also be graphite oxide. The solid graphite source can also include other materials, such as clay. In one embodiment, the solid graphite source is a pencil lead. In one embodiment, the mass percentage of the graphite and/or graphite oxide in the solid graphite source can be larger than or equal to 50%. In another embodiment, the mass percentage of the graphite and/or graphite oxide in the solid graphite source can be larger than or equal to 80%.

When the solid graphite source is an integrated graphite monolith, the integrated graphite monolith can have a relatively planar surface, which is convenient for the rubbing. During the rubbing, the relatively planar surface is in contact with the at least one surface of the current collecting metal substrate. A size of the integrated graphite monolith is not limited. In one embodiment, a largest length of the relatively planar surface of the integrated graphite monolith is larger than or equal to a width of the current collecting metal substrate. Thus, the graphite/graphene layer can be formed by one time of the rubbing to totally cover the at least one surface of the current collecting metal substrate. In another embodiment, the integrated graphite monolith rubs the at least one surface of the current collecting metal substrate until the desired surface is covered.

When the solid graphite source is the aggregated graphite powder, the aggregated graphite powder can be aggregated together by a fixing mean to form a fixed shape. The fixing mean can be a mold to accommodate the graphite powder, a meshwork to wrap the graphite powder, or a binder to adhere the graphite powder together. The meshwork can define a plurality of mesh to expose the graphite powder that is capable of being in contact with the at least surface of the current collecting metal substrate. Similar to the integrated graphite monolith, the shape and size of the aggregated graphite powder are not limited. In one embodiment, the aggregated graphite powder can have a relatively planar surface. The largest length of the relatively planar surface of the aggregated graphite powder is larger than or equal to a width of the current collecting metal substrate.

The graphite is constituted by a plurality of layers of graphene stacked with each other, and the layers of graphene have a loose interlamellar coupling therebetween. A part of the graphite can be exfoliated from the graphite by mechanical force. In the step S2, the friction force during the rubbing can exfoliate small graphite and/or even graphene from the solid graphite source. The friction force between the at least one surface of the current collecting metal substrate and the solid graphite source is larger than or equal to 0.02 N. The exfoliated small graphite and/or graphene can be adsorbed to the at least one surface of the current collecting metal substrate, to form the graphite/graphene layer. The graphite and/or graphene can have a grain shape or a sheet shape. The material of the graphite/graphene layer includes at least one of graphite and graphene. In one embodiment, the material of the graphite/graphene layer consist of graphite or graphene. In the present specification, the graphite is defined as including at least two layers of graphene stacked together. The number of layers of graphene in the graphite exfoliated from the solid graphite source is smaller. In one embodiment, the number of layers of graphene stacked together in the graphite in the graphite/graphene layer can be 2 to 20. The friction force during the rubbing is capable of exfoliating the graphite and/or graphene from the solid graphite source.

In one embodiment, the at least one surface of the current collecting metal substrate is rubbed with the solid graphite source entirely, to form the graphite/graphene layer totally covering the at least one surface. In another embodiment, the at least one surface of the current collecting metal substrate is partially rubbed with the solid graphite source, to form the graphite/graphene layer covering only a portion of the at least one surface. In one embodiment, the graphite/graphene layer covers at least 50% of the total area of the at least one surface of the current collecting metal substrate.

In the step S2, the rubbing step can include steps of contacting the planar surface of the integrated graphite monolith, or the aggregated graphite powder, with the at least one surface of the current collecting metal substrate and causing a relative movement between the integrated graphite monolith (or the aggregated graphite powder) and the current collecting metal substrate, to form the friction force therebetween.

In one embodiment, the 2B pencil lead is rubbed on the at least one surface of the current collecting metal substrate, to form the graphite/graphene layer.

Figure 2:
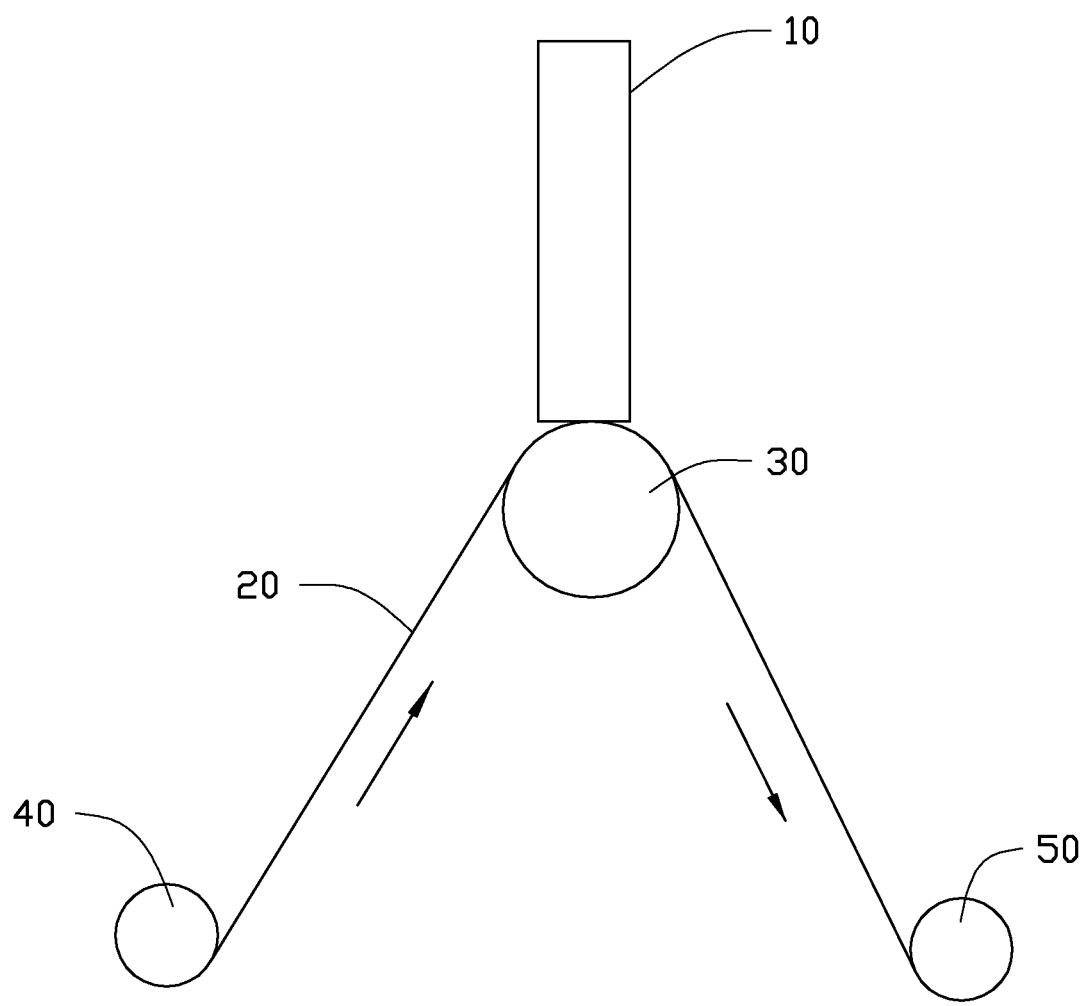
FIG. 2 is a view of one embodiment of the method for making the current collector of the electrochemical battery.

To be compatible with the industrial continuous manufacture, the belt shaped current collecting metal substrate having the relatively long length is used. Referring to FIG. 2, the step S2 can further include steps of:

S21, providing a roller 30; and

S22, passing the current collecting metal substrate 20 between the roller 30 and the solid graphite source 10, to rub the surface of the current collecting metal substrate 20 with the solid graphite source 10 during the passing.

The current collecting metal substrate 20 is gradually passed between the roller 30 and the solid graphite source 10 portion by portion. In the step S22, during the passing, the current collecting metal substrate 20 is always in contact with the surface of the roller 30 and the surface of the solid graphite source 10 on two sides. A space between the roller 30 and the solid graphite source 10 can be defined to enable the current collecting metal substrate 20 passing therethrough, and meanwhile the two opposite surfaces of the current collecting metal substrate 20 are in contact with the surface of the roller 30 and the surface of the solid graphite source 10. In one embodiment, the length of the surface of the solid graphite source 10 that is in contact with the current collecting metal substrate 20 is larger than or equal to the width of the current collecting metal substrate 20, wherein the length direction of the surface of the solid graphite source 10 is substantially perpendicular to the length direction of the current collecting metal substrate 20. Thus, the surface of the current collecting metal substrate 20 can be totally covered by the graphite/graphene layer only by once passing of the current collecting metal substrate 20.

Further, the portion of the current collecting metal substrate 20 before the passing of the roller 30 can be coiled on a first spool 40, and the portion of the current collecting metal substrate 20 after the passing of the roller 30 can be coiled on a second spool 50.

Figure 3:
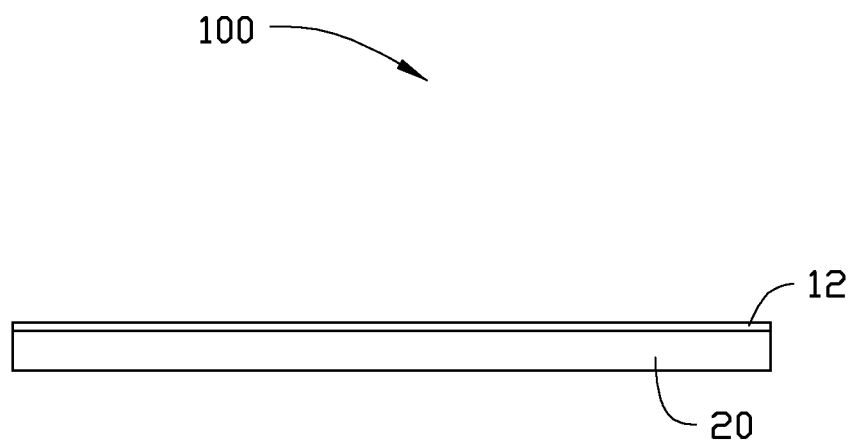
FIG. 3 is a view of one embodiment of the current collector of the electrochemical battery.

Referring to FIG. 3, the current collector 100 formed from the above described method includes a current collecting metal substrate 20 and a graphite/graphene layer 12 located on at least one surface of the current collecting metal substrate 20. The graphite and graphene both have relatively good conductivity and can be well combined to the current collecting metal substrate 20, by an intermolecular force between the current collecting metal substrate 20 and the graphite and/or graphene, due to a large specific surface area thereof. Thus, the bulk conductivity and chemical stability of the current collector 100 can be improved.

Figure 4:
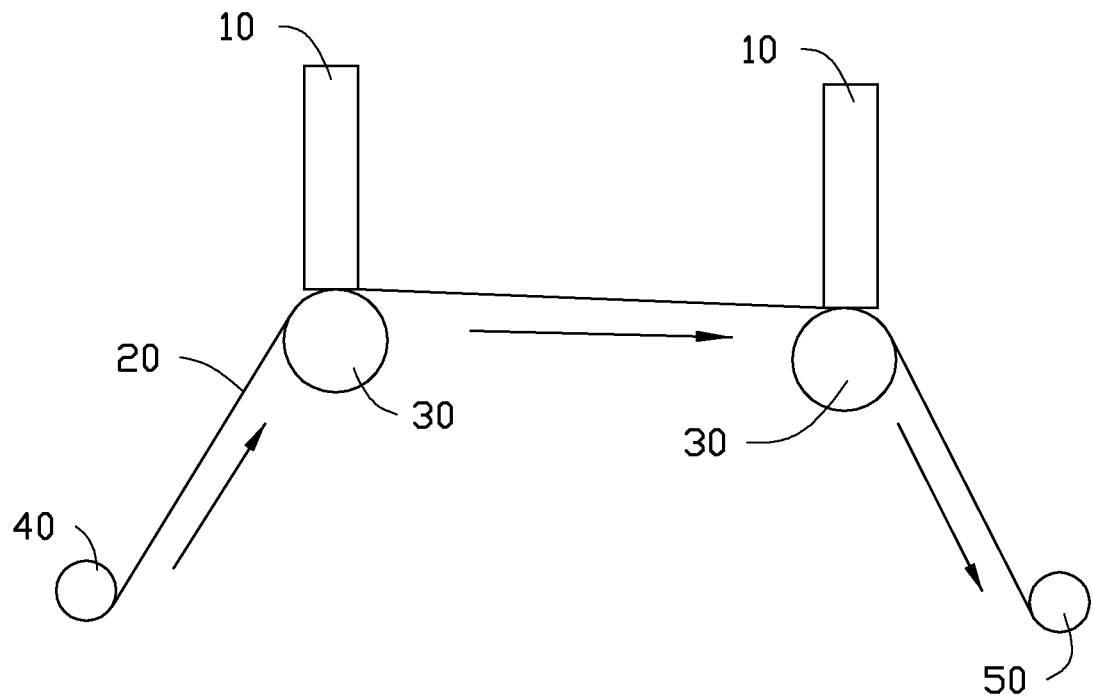
FIG. 4 is a view of another embodiment of the method for making the current collector of the electrochemical battery.

Referring to FIG. 4, in another embodiment, the step S21 can include a step of providing a plurality of rollers 30 and a plurality of solid graphite sources 10 spaced from the plurality of rollers 30 in a one to one manner. Correspondingly, the step S22 can include a step of passing the current collecting metal substrate 20 between the plurality of rollers 30 and the corresponding solid graphite sources 10, to rub the same surface of the current collecting metal substrate 20 with the plurality of solid graphite sources 10 during the passing. Thus, the graphite/graphene layer 12 having a desire area and thickness can be formed by using the plurality of solid graphite sources 10.

Figure 5:
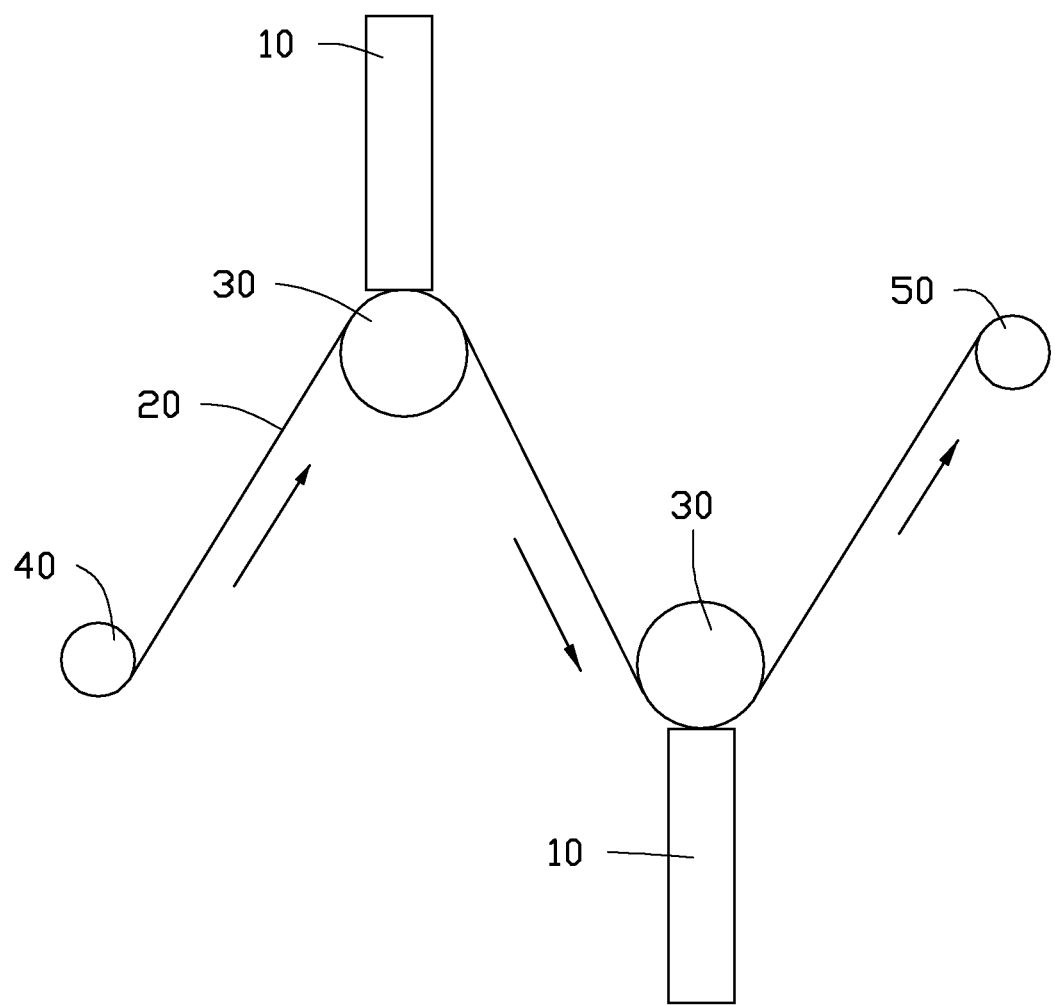
FIG. 5 is a view of yet another embodiment of the method for making the current collector of the electrochemical battery.

Furthermore, referring to FIG. 5, in yet another embodiment, the step S21 can include a step of providing a plurality of rollers 30 and a plurality of solid graphite sources 10 spaced from the plurality of rollers 30. The rollers 30 and the solid graphite sources 10 may be arranged in a one to one manner. Correspondingly, the step S22 can include a step of passing the current collecting metal substrate 20 between the plurality of rollers 30 and the corresponding solid graphite sources 10, to respectively rub the two opposite surfaces of the current collecting metal substrate 20 with the plurality of solid graphite sources 10 during the passing. Thus, the current collecting metal substrate 20 can have the two opposite surfaces each covered by one graphite/graphene layer 12.

Figure 6:
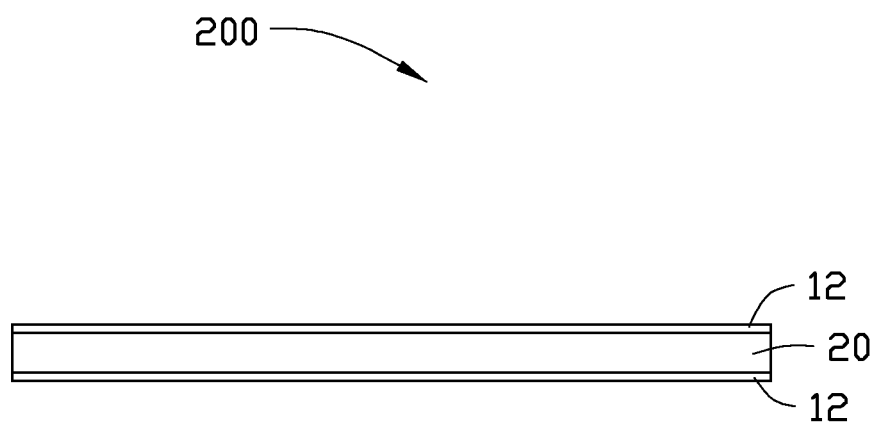
FIG. 6 is a view of another embodiment of the current collector of the electrochemical battery.

Referring to FIG. 6, the current collector 200 formed from the above described method includes a current collecting metal substrate 20 and two graphite/graphene layers 12 respectively located on the two opposite surfaces of the current collecting metal substrate 20.

The embodiments in FIG. 4 and FIG. 5 can be combined to pass the current collecting metal substrate 20 through the surfaces of the plurality of rollers 30 and rubbing the two opposite surfaces of the current collecting metal substrate 20 each with a plurality of solid graphite sources 10. Thus, the current collecting metal substrate 20 can have the two opposite surfaces each covered by one graphite/graphene layer 12 having a desired area and thickness.

The step S2 can further include a step of removing a float carbon on the surface of the current collecting metal substrate 20. Specifically, during the rubbing step, a portion of graphite and/or graphene exfoliated from the solid graphite source 10 may not be stably combined with the surface of the current collecting metal substrate 20, but forms the float carbon. The float carbon can be removed by applying a mechanical force to the surface of the current collecting metal substrate 20 having the float carbon thereon. The float carbon can be removed by using a soft tool, such as a brush, a sponge, a textile, or a plastic, to wipe the surface of the current collecting metal substrate 20. In one embodiment, after passing the roller 30, the current collecting metal substrate 20 can further pass through a surface of a sponge roller (not shown). The surface of the sponge roller contacts the surface of the current collecting metal substrate 20 having the float carbon thereon. Thus, the float carbon can be removed by the sponge roller. The float carbon can also be removed by using a flowing current to blow the surface of the current collecting metal substrate 20.

Due to the rubbing step, a small amount of graphite and/or graphene can be exfoliated from the solid graphite source 10. The exfoliated graphite and/or graphene are combined to the surface of the current collecting metal substrate 20 by intermolecular forces, to form an extremely thin conducting film (i.e., the graphite/graphene layer) on the surface of the current collecting metal substrate 20. The thickness of the graphite/graphene layer is decided by the friction force during the rubbing step and the float carbon removing step. In one embodiment, the thickness of the graphite/graphene layer can be in a range from about 0.34 nanometers to about 500 microns. The thinnest location on the graphite/graphene layer can be the thickness of only one graphene. In one embodiment, the thickness of the graphite/graphene layer can be smaller than or equal to about 2 microns.

In use, the graphite/graphene layer covers the at least one surface of the current collecting metal substrate to prevent direct contact between the current collecting metal substrate and the erosive solvent in the electrolyte, thus preventing the reaction between the current collecting metal substrate and the erosive solvent. The graphite/graphene layer has a relatively high conductivity. In use, the graphite/graphene layer can directly contact and combine with the electrode material layer in the electrode, to decrease the contact resistance between the current collector and the electrode active material.

Figure 7:
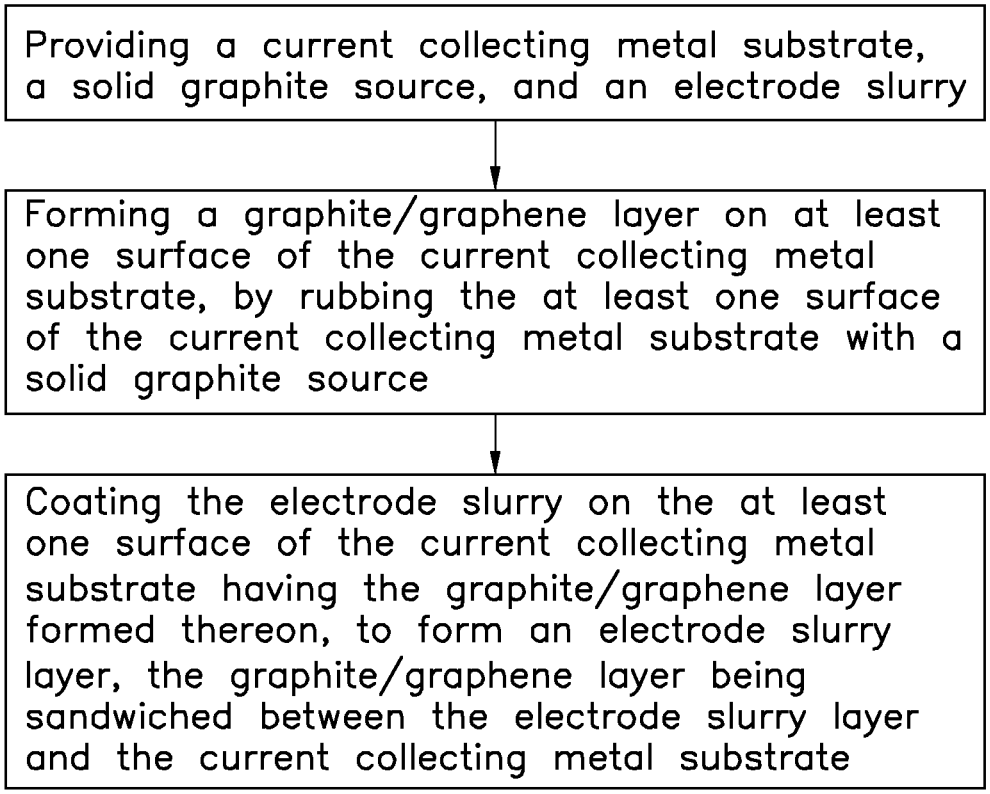
FIG. 7 is a flowchart of one embodiment of a method for making the electrode of the electrochemical battery.

Referring to FIG. 7, one embodiment of a method for making an electrode of a electrochemical battery includes steps of:

S1', providing a current collecting metal substrate, a solid graphite source, and an electrode slurry;

S2', forming a graphite/graphene layer on at least one surface of the current collecting metal substrate by rubbing the at least one surface of the current collecting metal substrate with the solid graphite source; and S3', coating the electrode slurry on the at least one surface of the current collecting metal substrate having the graphite/graphene layer formed thereon, to form an electrode slurry layer, and the graphite/graphene layer is sandwiched between the electrode slurry layer and the current collecting metal substrate.

The steps S1' and S2' are similar to the above described steps S1 and S2.

The electrode slurry can include electrode active material, conductive agent, solvent and binder uniformly mixed with each other. The electrode active material can be either cathode active material or anode active material. The conductive agent can be a carbonaceous material such as carbon black, acetylene black, conductive polymers, carbon fibers, carbon nanotubes, graphene, and graphite. The binder can be at least one of polyvinylidene fluoride, polytetrafluoroethylene, and styrene-butadiene rubber. The solvent can be at least one of N-methyl pyrrolidone, N,N-dimethylformamide, N,N-diethylformamide, dimethyl sulfoxide, and tetrahydrofuran.

In the step S3', the method for coating the electrode slurry on the at least one surface of the current collecting metal substrate can be spraying, brushing, screen printing, or blade coating. In an industrialized method, an electrode slurry continuous coating machine can be used to continuously coat the electrode slurry on the long belt shaped current collecting metal substrate. The continuously coating of the electrode slurry can be combined with the above described continuously forming of the graphite/graphene layer.

Figure 8:
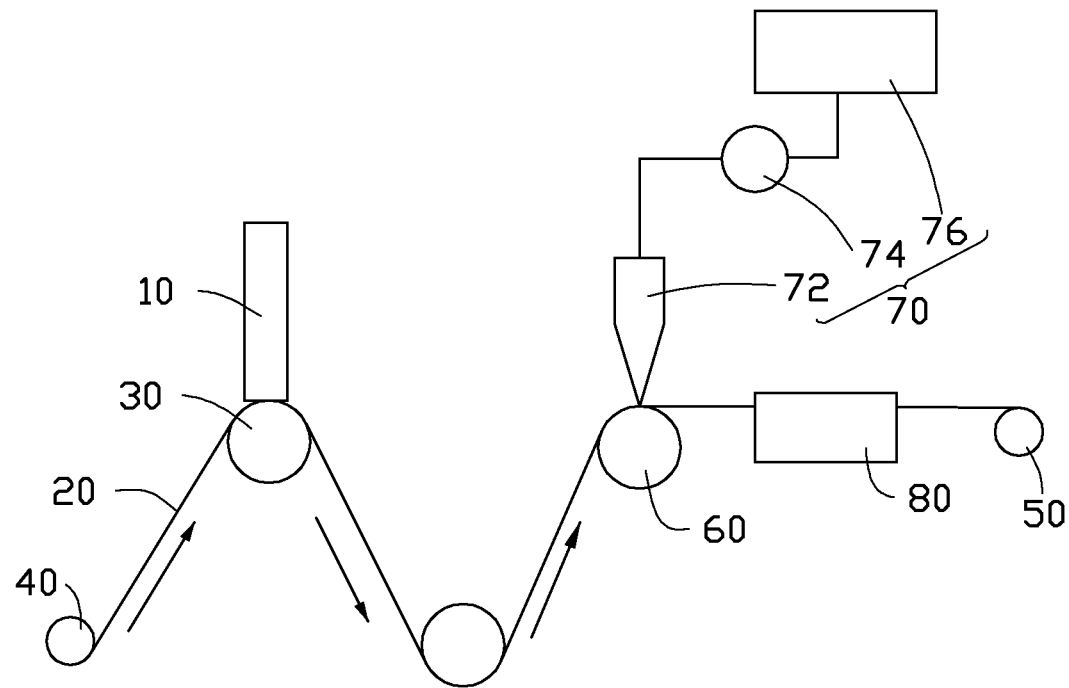
FIG. 8 is a view of one embodiment of the method for making the electrode of the electrochemical battery.

Referring to FIG. 8, the step S3 can include additional steps of passing the current collecting metal substrate 20 through a surface of a slurry coating roller 60, and coating the electrode slurry on the at least one surface of the current collecting metal substrate 20 having the graphite/graphene layer 12 formed thereon during the passing of the surface of the slurry coating roller 60. The additional steps can be processed after the above described step S22 and before coiling the current collecting metal substrate 20 to the second spool 50. In one embodiment, during the passing of the surface of the slurry coating roller 60, the graphite/graphene layer 12 formed on the at least one surface of the current collecting metal substrate 20 is exposed and coated by the electrode slurry from the electrode slurry continuous coating machine 70. The electrode slurry continuous coating machine 70 can be a gap coating machine or a roller coating machine. In one embodiment, the gap coating machine includes an electrode slurry container 76, a pump 74, and a coating head 72. The pump 74 pumps the electrode slurry from the electrode slurry container 76 to the coating head 72. A gap is defined between the surface of the current collecting metal substrate 20 and the coating head 72. During the passing of the current collecting metal substrate 20 on the slurry coating roller 60, the electrode slurry is coated on the graphite/graphene layer 12 by the coating head 72.

Further, the step S3 can include a drying step to dry the electrode slurry layer on the current collecting metal substrate 20 and remove the solvent in the electrode slurry layer. More specifically, after the coating the electrode slurry by passing the current collecting metal substrate 20 through the surface of the slurry coating roller 60 and before the step of coiling the current collecting metal substrate 20 to the second spool 50, the step S3 can further include step of passing the current collecting metal substrate 20 through an oven 80 and gradually heating the current collecting metal substrate 20 in the oven 80.

Figure 9:
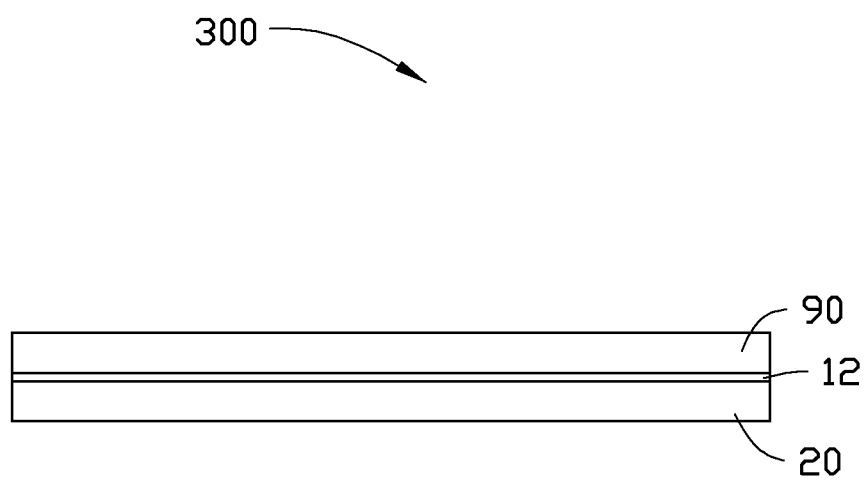
FIG. 9 is a view of one embodiment of the electrode of the electrochemical battery.

Referring to FIG. 9, the electrode 300 of the electrochemical battery, formed by the above described method, includes the current collector 100 or 200 and further includes the electrode slurry layer 90, coated on the graphite/graphene layer 12 on the current collecting metal substrate 20.

The method for making the current collector and the method for making the electrode of the electrochemical battery does not need the complicated processes for producing the graphene powder, the dispersing of the graphene powder in the solvent, and the coating the graphene solution. The solid graphite source is directly rubbed on the surface of the current collecting metal substrate which can be a commercial current collector, thus the method is simple and low in cost. The method can be easily compatible with the electrode slurry coating process in the electrochemical battery manufacture industry. The electrochemical battery using the graphite/graphene layer contained current collector formed by the present method has a high capacity and capacity retention.

EXAMPLE 1

The graphite/graphene layer is formed on a surface of an aluminum foil. The thickness of the graphite/graphene layer is about 20 nanometers. The cathode active material is a sulfur grafted poly(pyridinopyridine) (SPPY). The SPPY includes a poly(pyridinopyridine) (PPY) matrix and sulfur dispersed in the PPY matrix. The SPPY is formed by a method includes steps of: mixing elemental sulfur with polyacrylonitrile (PAN) to form a mixture; heating the mixture in a sealed container having a protective gas therein at a temperature of about 350° C. for about 2 hours, to form a sulfur contained composite; and heating the sulfur contained composite in vacuum at about 150° C. for about 1 hour. In the electrode slurry, the binder is polyvinylidene fluoride, the solvent is N-methyl pyrrolidone, and the conductive agent is acetylene carbon black. The mass ration of the SPPY, acetylene carbon black, and polyvinylidene fluoride is about 7:2:1. The electrode slurry is coated on the graphite/graphene layer on the aluminum foil and dried at 120° C. for about 24 hours to remove the N-methyl pyrrolidone, to form the cathode electrode. The anode electrode is lithium metal. The electrolyte is 1 mol/L lithium hexafluorophosphate ($LiPF_6$) in a solvent of diethyl carbonate and ethylene carbonate (1:1, v:v). The separator is a polypropylene film. The lithium ion battery is assembled in a glove box.

COMPARATIVE EXAMPLE 1

In the Comparative Example 1, a lithium ion battery is assembled under the same conditions as the Example 1, except that the aluminum foil is solely used as the cathode current collector without the graphite/graphene layer formed thereon.

Figure 10:
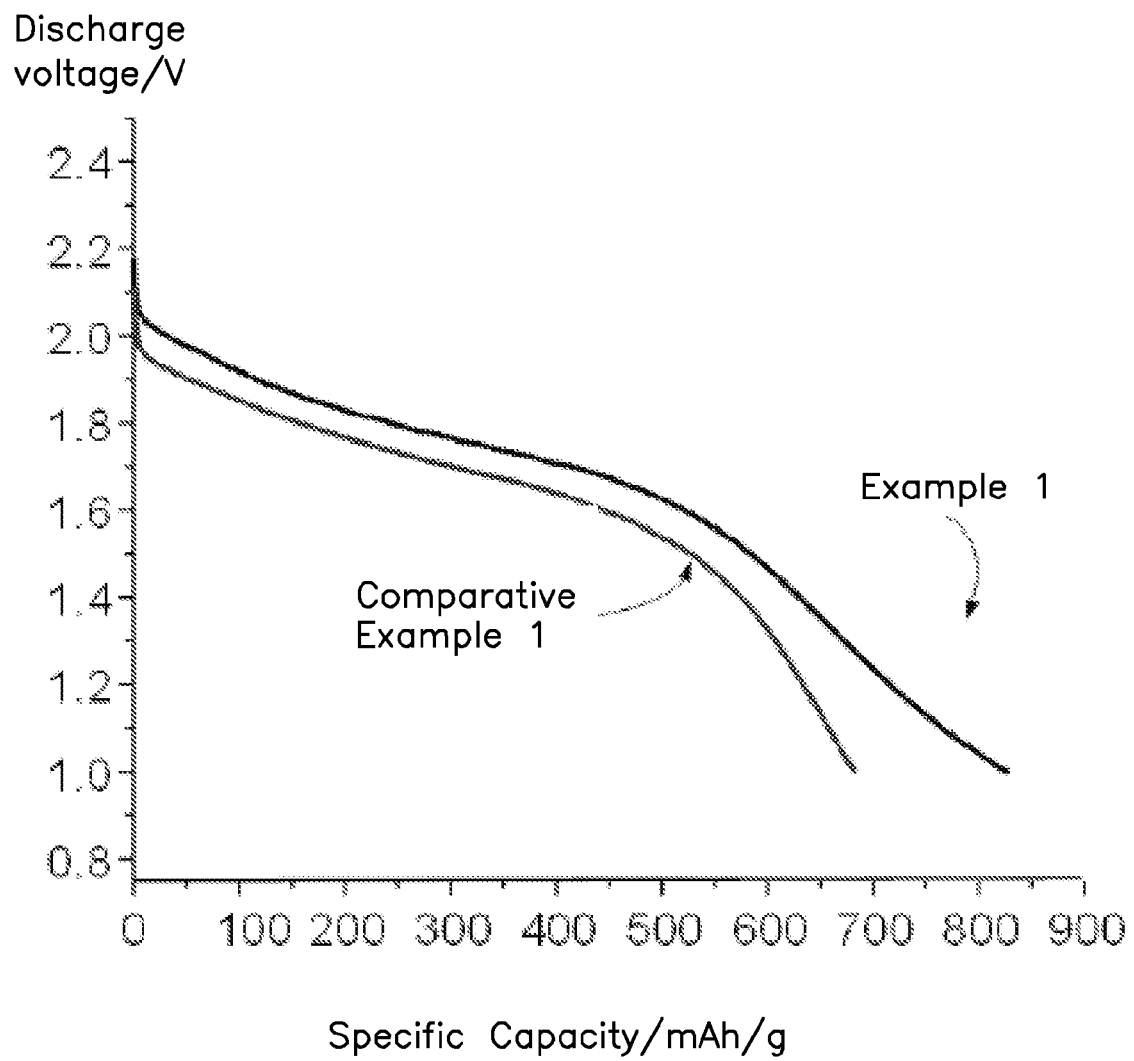
FIG. 10 is graph comparing discharge curves of lithium ion batteries of Example 1 and Comparative Example 1.
Figure 11:
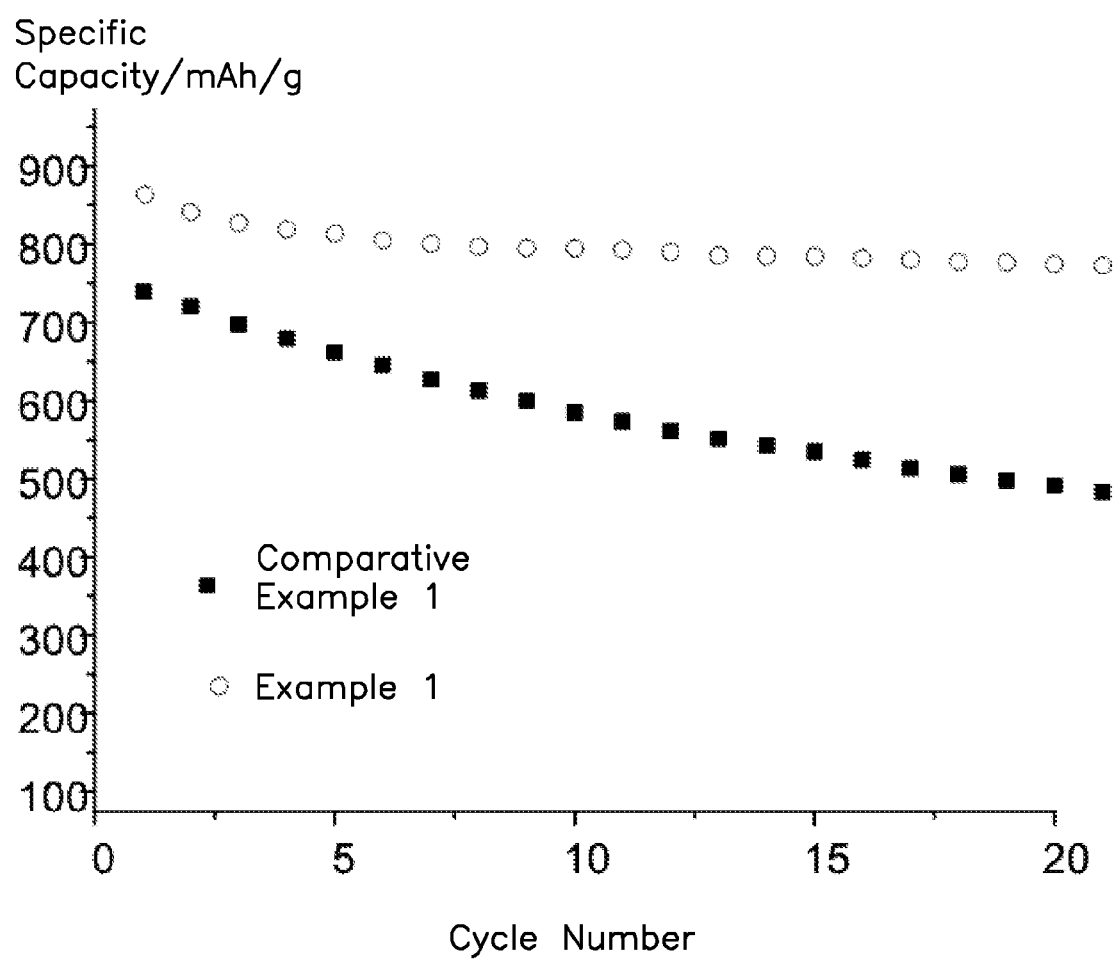
FIG. 11 is a graph comparing cycle performance testing results of the lithium ion batteries of Example 1 and Comparative Example 1.

Referring to FIG. 10 and FIG. 11, by comparing the discharge curves and the cycle performance testing results of lithium ion batteries of Example 1 and Comparative Example 1, it can be seen that the lithium ion battery using the graphite/graphene layer covered current collector has a relatively higher discharge capacity and capacity retention.

EXAMPLE 2

In the Example 2, a lithium ion battery is assembled under the same conditions as the Example 1, except that the cathode active material is olivine type lithium iron phosphate ($LiFePO_4$).

COMPARATIVE EXAMPLE 2

In the Comparative Example 2, a lithium ion battery is assembled under the same conditions with the Example 2, except that the aluminum foil is solely used as the cathode current collector without the graphite/graphene layer formed thereon.

Figure 12:
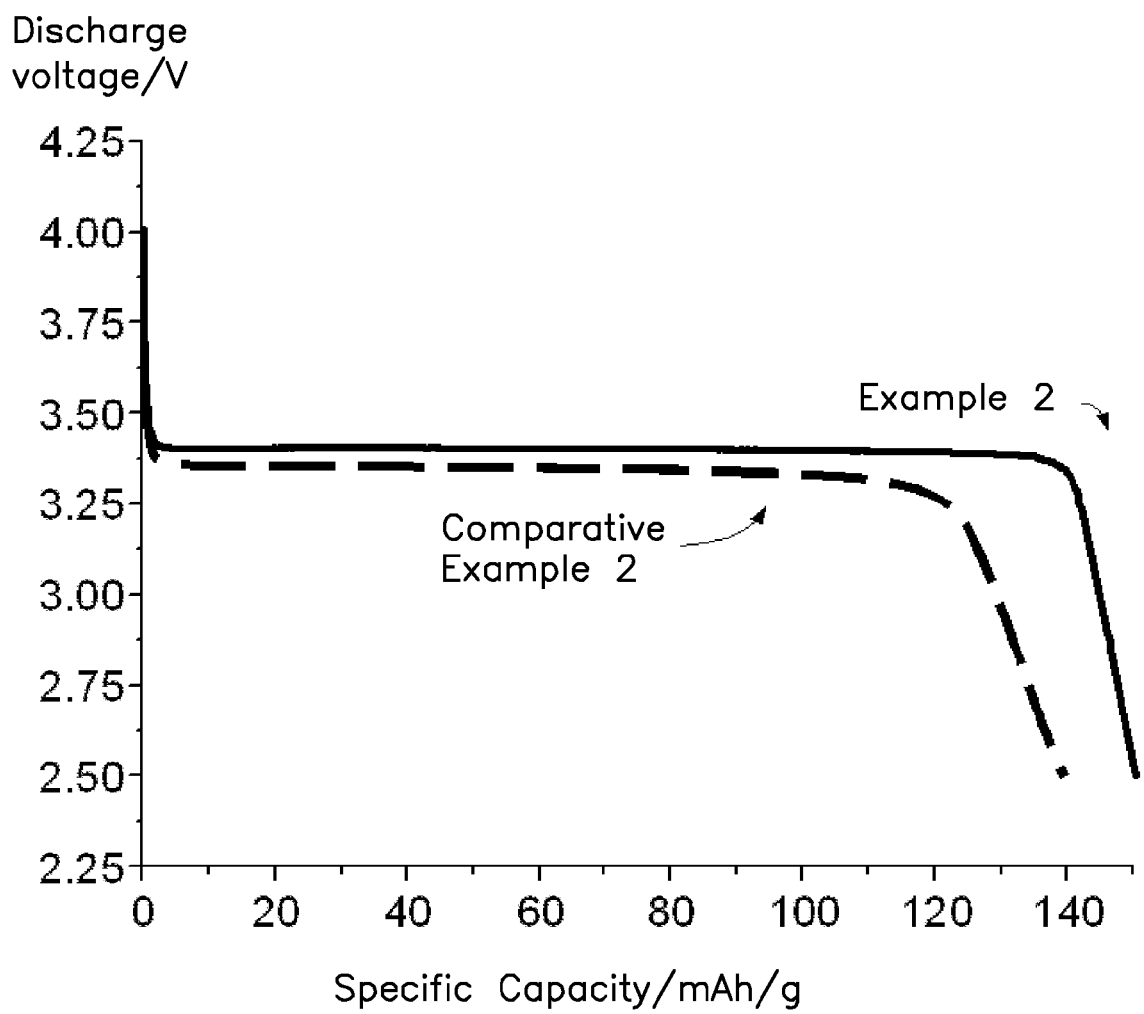
FIG. 12 is a graph comparing discharge curves of the lithium ion batteries of Example 2 and Comparative Example 2.

Referring to FIG. 12, by comparing the discharge curves of lithium ion batteries of Example 2 and Comparative Example 2, it can be seen that the lithium ion battery using the graphite/graphene layer covered current collector has a relatively higher discharge capacity.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:
1. A method for making a current collector of an electrochemical battery comprising steps of:
   providing a metal substrate and a solid graphite; and
   forming a graphene layer on at least one surface of the metal substrate, by rubbing the at least one surface of the metal substrate with the solid graphite, the rubbing comprising:
      providing a plurality of first rollers, and the solid graphite comprising a plurality of first solid graphites being spaced from the plurality of first rollers; and
      passing the metal substrate between the plurality of first rollers and the plurality of first solid graphites, to respectively rub two opposite surfaces of the metal substrate with the plurality of first solid graphites.

2. The method of claim 1, wherein the solid graphite is an integrated graphite monolith or an aggregated graphite powder.

3. The method of claim 1, wherein the solid graphite has a relatively planar surface, the rubbing comprises:
contacting the surface of the solid graphite with the at least one surface of the metal substrate, and
causing a relative movement between the solid graphite and the metal substrate, to form a friction force therebetween.

4. The method of claim 1, wherein a portion of the metal substrate, previous to the passing of the plurality of first rollers, is coiled on a first spool, and another portion of the metal substrate after the passing of the plurality of first rollers, is coiled on a second spool.

5. The method of claim 1, wherein a length of the surface of the solid graphite is greater than or equal to a width of the at least one surface of the metal substrate, and a length direction of the surface of the solid graphite is substantially perpendicular to a length direction of the metal substrate.

6. The method of claim 1, wherein the rubbing comprises:
providing a plurality of second rollers, and the solid graphite comprising a plurality of second solid graphites spaced from the plurality of second rollers; and
passing the metal substrate between the plurality of second rollers and the plurality of second solid graphites to rub the at least one surface of the metal substrate with the plurality of second solid graphites.

7. The method of claim 1, wherein the graphene layer covers at least 50% of a total area of the at least one surface of the metal substrate.

8. The method of claim 1, wherein during the rubbing, a friction force between the at least one surface of the metal substrate and the solid graphite is larger than or equal to 0.02 N.

9. The method of claim 1, wherein a thickness of the graphene layer is in a range from about 0.34 nanometers to about 500 microns.

10. The method of claim 1, wherein a thickness of the graphene layer is less than or equal to 2 microns.

11. A method for making an electrode of an electrochemical battery comprising steps of:
providing a metal substrate, a solid graphite, and an electrode slurry;
forming a graphene layer on at least one surface of the metal substrate, wherein the forming the graphene layer comprises rubbing the at least one surface of the metal substrate with the solid graphite, the rubbing comprising:
providing a plurality of first rollers, and the solid graphite comprising a plurality of first solid graphites being spaced from the plurality of first rollers; and
passing the metal substrate between the plurality of first rollers and the plurality of first solid graphites, to respectively rub two opposite surfaces of the metal substrate with the plurality of first solid graphites; and
coating the electrode slurry on the at least one surface of the metal substrate having the graphene layer formed thereon, to form an electrode slurry layer, the graphene layer being sandwiched between the electrode slurry layer and the metal substrate.

12. The method of claim 11, wherein the coating comprises continuously coating the electrode slurry on the metal substrate by an electrode slurry continuous coating machine.

13. The method of claim 12, wherein the electrode slurry continuous coating machine is a gap coating machine or a roller coating machine.

14. The method of claim 11, wherein the coating comprises:
passing the metal substrate through a surface of a slurry coating roller, and
coating the electrode slurry on the at least one surface of the metal substrate having the graphene layer formed thereon during the passing of the surface of the slurry coating roller.

15. The method of claim 11, wherein the solid graphite is at least one of natural graphite and synthetic graphite.

16. A method comprising:
providing a metal substrate and an aggregated graphite powder, and the aggregated graphite powder being aggregated together by a fixing mean to form a fixed shape; and
forming a graphite/graphene layer on at least one surface of the metal substrate, by rubbing the at least one surface of the metal substrate with the aggregated graphite powder, the graphite/graphene comprising at least one of graphite and graphene,
wherein the metal substrate and the graphite/graphene layer together form a current collector of an electrochemical battery, and the fixing mean is a meshwork wrapping the graphite powder and defining a plurality of mesh to expose graphite that is capable of being in contact with the at least surface of the metal substrate.

17. The method of claim 16, wherein the graphite/graphene layer is a graphene layer comprising graphene.

* * * * *